FIP8106 XR 3,333,101

July 25, 1967 W. E. BELL 3,333,101

ELECTROMAGNETIC ENERGY CONVERSION AND DETECTION SYSTEM AND METHOD

Filed Feb. 7, 1963

INVENTOR.
W.E. BELL
BY
Fleh and Swain
ATTORNEYS

United States Patent Office 3,333,101
Patented July 25, 1967

3,333,101
ELECTROMAGNETIC ENERGY CONVERSION AND DETECTION SYSTEM AND METHOD

William E. Bell, Palo Alto, Calif., assignor to Spectra-Physics, Inc., Mountain View, Calif., a corporation of California Filed Feb. 7, 1963, Ser. No. 257,031
21 Claims. (Cl. 250—83.3)

Figure 1:
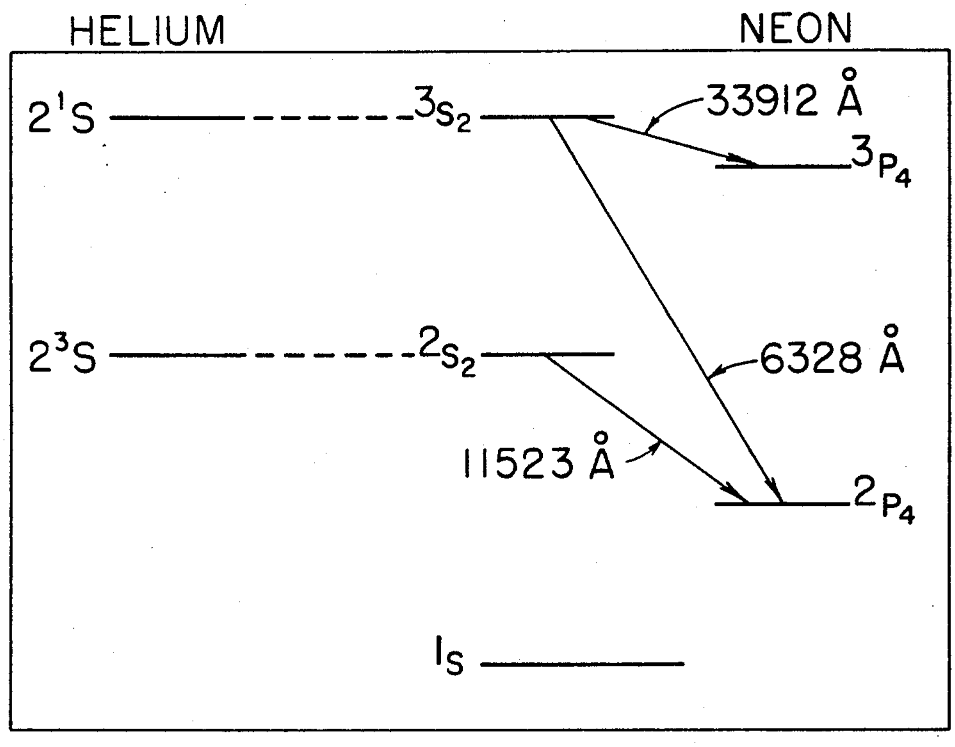

This invention relates generally to an electromagnetic energy conversion and/or detection system and method in which electromagnetic radiation acts upon the energy levels of atoms, and more particularly those atoms in a state of energy inversion which may give rise to optical maser action.

A difficulty in the use of electromagnetic energy of short wave lengths such as in the millimeter, submillimeter and infrared region, is the problem of efficiently detecting the energy. For example, in the infrared region, lead sulphide and other solid state detectors are relatively inefficient as compared to detectors in the shorter wave lengths such as for the visible. Also, thermal radiation, especially from warm or hot sources, may introduce a serious background problem. Efficient detectors for electromagnetic waves are not available in the millimeter and submillimeter region electromagnetic spectrum.

It is, therefore, a general object of the present invention to provide an electromagnetic energy conversion and detection system and method suitable for converting and detecting infrared, submillimeter and millimeter electromagnetic radiation.

It is another object of the present invention to provide a conversion and detection system and method having a high sensitivity, low noise and narrow band characteristics.

It is still another object of the present invention to provide an electromagnetic wave detection and conversion system and method in which electromagnetic radiation at one wave length is converted by quantum conversion to energy at another more convenient wave length.

It is another object of the invention to provide an improved method of detecting electromagnetic energy in regions of the spectrum where the presently available detectors are inadequate such as in the regions which extend from wave lengths above one micron to one hundred or more microns.

It is another object of the present invention to provide an electromagnetic wave conversion and detection system and method which will respond to a narrow band of electromagnetic radiation centered about a specific wave length.

It is still another object of the present invention to provide an electromagnetic wave conversion and detection system and method having rapid or high frequency response.

It is still another object of the present invention to provide a method of converting and detecting electromagnetic energy by converting the energy from one frequency to a second frequency which employs an optical maser oscillation utilizing two atomic energy levels with the upper level having a greater population than the lower level to produce radiation at the second frequency with an intensity dependent upon the difference in population between the upper level and the lower level, and then inducing by radiation at said first frequency transition from one of said levels to a third level of the atomic system to alter the population of one of the first and second levels to thereby alter the intensity of the radiation at the second frequency.

It is another object of the present invention to provide a system for detecting infrared radiation employing an optical maser having a helium-neon mixture by inducing transitions in said systems which alter the intensity of the optical maser oscillation.

It is still a further object of the present invention to provide a quantum converting system for converting electromagnetic energy from one frequency to another in which there is set up first and second maser oscillations between first and second energy levels and third and fourth energy levels, respectively, with two of said energy levels being common to both maser oscillations to produce radiation at said one and said other frequency, the intensity of which is dependent upon the population difference between the respective energy levels in which changes in the amplitude of oscillations of one said optical maser oscillations changes the amplitude of oscillation of the other maser oscillation.

The foregoing and other objects of the invention will be more clearly understood from the following description when taken in conjunction with the accompanying drawings.

Figure 2:
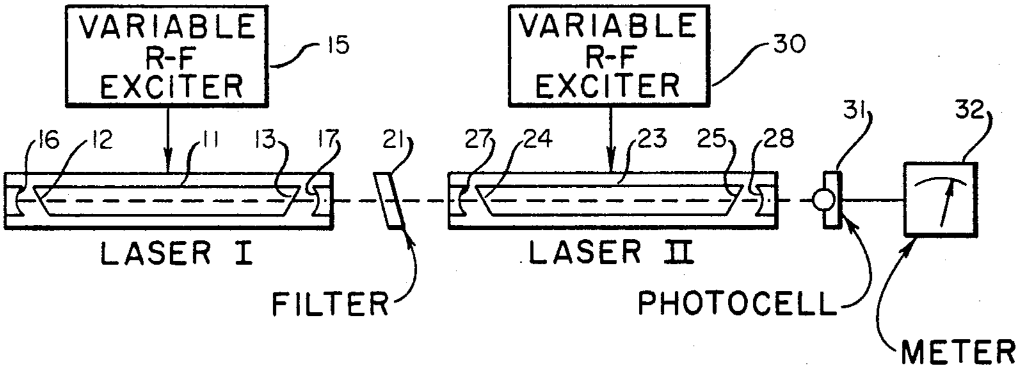

Referring to the drawings:

FIGURE 1 is a diagram showing the energy states and certain transitions for a helium-neon mixture; and FIGURE 2 shows a system employing a conversion and detection system in accordance with the present invention.

Generally, the quantum converter of the present invention is a device in which an optical maser radiating at one wave length converts essentially with unity quantum efficiency each photon of radiation applied thereto at another wavelength.

As an illustrative example, consider the helium-neon gas laser with energy level diagram such as that shown in FIGURE 1. If the optical maser is operating in a transition between the upper $3S_2$ state and the lower $2P_4$ state, optical maser action will take place when the $3S_2$ level has a greater population than the $2P_4$ level to oscillate at a frequency corresponding to a wave length of 6328 A. For this particular atomic system under the normal conditions in a helium-neon laser, the $3S_2$ level also has a greater population than the $3P_4$ level with the wave length of the transition frequency being 33912 A.

If one now considers that the 33912 A. radiation is supplied to a laser, which is operating at the transition between the $3S_2$ and $2P_4$ level in neon and is radiating 6328 A. energy, the radiation will induce transitions between the $3S_2$ and the $3P_4$ level. Since there is a greater population in the $3S_2$ level than in the $3P_4$, the effect of this radiation will be to transfer population from the $3S_2$ to the $3P_4$ level. For each quantum of incident radiation which interacts with the neon atomic system, one neon atom will be removed from the $3S_2$ level and transferred to the $3P_4$ level. This atom is then unavailable for the $3S_2$ to $2P_4$ laser transition and one quantum of radiant output is removed from the 6328 A. radiation. By this means, an essentially unit quantum efficiency means exists for the conversion of each one of the 33912 A. quanta of radiation to an absence of a quantum of 6328 A. radiation.

In this same atomic system, the $2S_2$ level is more heavily populated than the $2P_4$ level with the wave length of the transition being 11532 A. If the optical maser is operating at 6328 A. and is radiated with 11523 A. wave length radiation, for each quantum of the 11523 A. radiation which interacts with the laser medium, one neon atom will be transferred from the $2S_2$ level to the $2P_4$ level. This again will have the effect of removing one quantum of radiation from the 6328 A. output because it reduces the net difference of population between the upper $3S_2$ level and the lower $2P_4$ level.

Referring to FIGURE 2, there is shown a detection system using quantum conversion for detecting the energy from Laser I which comprises a Laser II which receives the energy from Laser I and provides a change in radiant energy to a photocell 31 whose output is connected to a suitable metering device 32 which provides an indication of the change of intensity of the output.

The first optical maser (Laser I) includes a glass envelope 11 filled with a mixture of helium and neon gases at suitable pressure. Transparent windows 12 and 13, for example, quartz windows, are sealed to the ends of the tubular envelope and positioned at an angle with respect to the axis so as to reduce radiant energy loss due to reflection from the surface of the windows. Exterior of the envelope and adjacent the windows 12 and 13 are disposed two highly reflective multi-layer dielectric reflectors 16 and 17 which, in accordance with well known principles, serve to reflect the appropriate wave length of energy to set up standing waves within the gaseous mixtures. The standing waves are amplified or increased by the energy released as the atoms fall from the upper energy level to the lower energy level which defines the masing transition.

The mirror 17 is selected to be less than completely reflectant, for example, ninety-nine percent reflective whereby useful coherent output radiation is obtained. This energy, is shown in FIGURE 2 as being projected toward the filter 21 which may be provided to filter out any unwanted wave lengths such as the visible when employing the 33912 A. mode and then applied to the Laser II which serves as the electromagnetic quantum energy conversion system for converting the energy and supplying the converted energy to the photocell 31. The helium-neon gas mixture is caused to glow discharge by an electrodeless system which is capacitively coupled to the gas mixture and excited by the variable RF exciter 15.

The Laser II which serves to convert the frequency of the electromagnetic energy is constructed in the same manner as the Laser I and includes a tubular envelope 23 which is filled with a gaseous mixture and which includes end windows 24 and 25. Highly reflecting multi-layer reflectors 27 and 28 are disposed exterior of the envelope and adjacent the windows for setting up the standing waves within the tube. A suitable electrodeless exciting system including the variable RF exciter 30 is provided.

The output from the Laser II, which is described above and will be further described below, is at an electromagnetic wave frequency differing from the input, it is applied to a detector such as the photocell 31. The output of the detector is applied to a meter which gives an indication of the change in level of the radiation from Laser II. As will be presently apparent, the system provides an efficient system for detecting in that it converts energy on a quantum basis at a wave length which is difficult to detect to energy, at a different wave length, for example, in the visible region, which can be easily detected by high efficiency photocells.

Referring now specifically to the system set forth and assuming that the Laser I is lasing at the transition between the $3S_2$ upper energy level and the $3P_4$ lower energy level to emit radiation at a wave length of 33912 A., it is known this (infrared) wavelength is relatively difficult to detect. However, the output is applied to the filter 21 which will filter out any visible radiation and then it is applied to the Laser II. The Laser II is selected so that it is operating between the $3S_2$ upper energy level and the lower energy level $2P_4$ whereby the transition serves to emit electromagnetic radiation in the visible portion of the electromagnetic system, for example at the frequency represented by the wavelength 6328 A. As described above, the infrared radiation having a wave length of 33912 A. serves to cause transitions in the laser between the $3S_2$ level and the $3P_4$ level, and will reduce the population at the $3S_2$ level available for lasing with the $2P_4$ level, and thus on a quantum basis, will reduce the intensity of the visible radiation at the 6328 A. This, in turn, is detected by the photocell which provides an output to the meter.

For the highest sensitivity, the Laser II can be adjusted just at above threshold of oscillation for the 6328 A. transition. Thus, a small amount of impinging 33912 A. radiation will be sufficient to extinguish the 6328 A. oscillation.

The noise level of the output from Laser II is dependent upon a number of processes within the laser mechanism itself; for example, the interaction of residual infrared with the laser, amplified spontaneous emission with the infrared and visible, etc. There are also other factors which provide noise in the output.

By applying the various considerations and noise sources to a 3.39 wave length electromagnetic energy detector, a spontaneous emission noise per unit band width, per unit mode, assuming a gain of 2 is about $10^{-12}$ watts. However, the actual noise level is considerably higher than this. Several geometric modes of the electromagnetic radiation may exist within the laser simultaneously, and the sum of their noise powers will be effective in reducing the intensity of the output; and whereas only the population difference between the two energy levels is effective in determining the measured gain, the totality of population in the upper energy level determines the amount of spontaneous emission. Taking these two factors together, the ultimate noise level of the detector may be in the neighborhood of $10^{-10}$ and $10^{-12}$ watts. Of course, the laser detector can always be preceded by an amplifier that is not part of the detector, and then sensitivities approaching the limits of the uncertainty principle may be achieved.

The foregoing is a specific example of an optical maser including a helium-neon mixture and operating between the specific energy levels $3S_2$, $3P_4$, $2P_4$ and $2S_2$ has been given. However, it is apparent that the same principles may be generalized. Generally, the same quantum effect of changing the intensity of the radiation is achieved in a laser by radiating the medium of the laser with radiation lying within one line width of a transition from either the upper or lower laser energy levels to any other energy level of the atomic system.

If the radiating wave length corresponds to the transition between the upper laser energy level and a third level of the atomic or molecular system with a population less than the population of the upper energy level, then the effect of incident radiation will be to transfer population from the upper energy level to the third level and cause a decrease in the population of the upper level. This is then reflected in a decrease in the population difference between the upper level and the lower level with which it is lasing, thereby reducing the intensity of output radiation at the lasing frequency or wave length.

If the upper energy level has a population which is less than the third atomic or molecular energy level which has a transition with the upper energy level at the frequency of the radiating energy, then the incident energy will cause an increase in population of the upper energy level. This increases the population difference between the lasing energy levels and atoms in the upper energy level can enter into the lasing action between the upper energy level and its associated transition level to thereby increase the laser output.

If the radiating wave length is such that it will cause transitions between the lower energy level and a third energy level having a higher population than the lower energy level, it will increase the net population of the lower energy level decreasing the population difference between the upper level and the lower level to decrease the radiation.

On the other hand, if the third energy level has a population less than the population of the lower energy level, then incident radiation will cause a transfer of population from the lower level to the third level and thereby increase the net population difference between the upper level and the lower level to increase the intensity of output radiation.

Thus, it is seen that the optical maser is responsive to radiation within a line width of the frequency characteristic of a transition between a third energy level and either the upper or lower energy levels to change on a quantum basis the output radiation.

The foregoing described operation is not limited to an optical maser which is masing at a single frequency but may also be applicable to a maser that is masing at a pair of frequencies such as the maser shown in the energy diagram of FIGURE 1 wherein the maser is masing between the levels $3S_2$ and the levels $3P_4$ and $2P_4$ simultaneously to provide output radiation at both of the wave length of 6328 A. and 33912 A. It is then seen that there is provided an optical maser having two masing frequencies having a common transition level. For example, the common transition level may be the upper $3S_2$ state when the maser is operating at 6328 A. and 33912 A. and the common state may be the lower $2P_4$ state when the laser is operating at 6328 A. and 11523 A.

By inducing a change in population in any one of the states, for example, by causing the transition between the respective state and another atomic state, the overall system balance can be changed. If the transition is caused when the optical maser is operating at 6328 A. and 33912 A. simultaneously, then energy in the 6328 A. wave length can either be increased or decreased reflecting the intensity of oscillation in the 33912 A. lasing oscillator because of the change of population in the $3S_2$ state.

However, the foregoing cascade principle is more important in converting long wave energy to visible or short wave energy which can be detected. For example, if the energy of relatively long wave length, in the submillimeter or millimeter region of the electromagnetic spectrum can cause a transition between the $3P_4$ state and some other transition state, then this will serve to alter the amplitude of oscillation at the 33912 A., in turn, this will decrease or increase the population of the $3S_2$ state which will be reflected in the net population difference between the two $3S_2$ and $2P_4$ states, thereby increasing or decreasing the intensity of the radiation at 6328 A. which can be more easily detected.

I claim:

1. Method of detecting electromagnetic energy at one frequency by the detection of electromagnetic energy at another frequency, which comprises: exciting an active medium to produce a first population inversion between upper and lower energy levels in an atomic system of said medium, and a second population inversion between one of said levels and a third energy level of said atomic system; setting up at least one optical maser oscillation, said oscillation producing radiation at said other frequency with an intensity dependent upon the difference in population between said upper and lower energy levels; exposing said oscillating medium to radiation at said one frequency which is effective to induce transitions between the energy levels of said second population inversion thereby to alter the difference in population between said maser energy levels and change the intensity of radiation at said other frequency; and sensing the radiation at said other frequency as an indication of the radiation at said one frequency.

2. Apparatus according to claim 1 wherein said active medium is a gaseous medium and said gaseous medium is excited by establishing an electrical discharge therein.

3. The method as in claim 1 wherein the population of the upper level is increased by inducing by radiation at said one frequency transitions between the upper level and a third level having a higher population than the upper energy level to increase the population difference between the upper energy level and the lower energy level to thereby increase the intensity of radiation at said other frequency.

4. The method as in claim 1 wherein the population of the upper energy level is decreased by inducing by radiation at said one frequency transitions between the upper level and a third level having a lower population than the upper energy level to decrease the population difference between the upper energy level and the lower energy level to thereby decrease the radiation at said other frequency.

5. The method as in claim 1 wherein the population of the lower energy level is increased by inducing by radiation at said one frequency transitions between the lower level and a third level having a higher population than the lower energy level to decrease the population difference between the upper energy level and the lower energy level to thereby decrease the radiation at said other frequency.

6. The method as in claim 1 wherein the population of the lower energy level is decreased by inducing by radiation at said one frequency transitions between the lower energy level and the third level having a lower population than the lower energy level to increase the population difference between the upper and lower energy levels to thereby increase the intensity of radiation at said other frequency.

7. The method as in claim 1 wherein the third energy level has a lower energy and a lower population than that of the upper energy level whereby the transitions between the upper energy level and the third energy level decrease the population of the upper energy level and decrease the population difference between the upper energy level and the lower energy level to thereby decrease the intensity of the output radiation.

8. The method as in claim 7 wherein the radiation at said other frequency is radiation in the visible spectrum and wherein said radiation at said one frequency is in the infrared spectrum.

9. The method as in claim 1 wherein said atomic energy levels are energy levels in neon and selected to produce radiation at a frequency corresponding to the wavelength 6328 A. and said third level having a transition with the upper level which has a frequency corresponding to radiation at 33912 A.

10. The method as in claim 1 wherein the third level has a higher energy level and a higher population than the lower energy level whereby the induced transitions between the third level and the lower energy level serve to increase the population of the lower energy level and thereby decrease the population difference between the upper enregy level and the lower energy level to thereby decrease the intensity of radiation.

11. The method of converting quanta of electromagnetic energy from one frequency to another which comprises setting up first and second maser oscillations between first and second energy levels and third and fourth energy levels respectively with two of said energy levels being common to both maser oscillations to produce radiation at said one and another frequency, the intensity of which is dependent upon the population difference between these respective energy levels, and changing the amplitude of oscillations of one of said maser oscillations thereby changing the population difference and intensity of the other.

12. The method as in claim 11 in which the change in amplitude of oscillation is induced by radiation at a third frequency to cause transitions between one of said energy levels and a fifth energy level of the atomic system to alter the population of one of said energy levels to thereby alter the amplitude of oscillations of the corresponding maser.

13. The method as in claim 12 wherein the population of one of the uncommon energy levels is altered by causing transitions between the fifth energy level and one of the uncommon levels in response to radiation at the third frequency.

14. The method of claim 1 wherein said transitions are effected between said third energy level and the upper energy level of said optical maser oscillation.

15. The method of claim 14 wherein said energy levels are energy levels of neon atoms, said detected electromagnetic radiattion is at a wavelength of approximately 33912 A., and said sensed optical maser oscillation is at a wavelength of approximately 6328 A.

16. A method of detecting the intensity of an optical maser oscillation which comprises the steps of: establishing a first optical maser oscillation between two energy levels of an active medium; establishing a second optical maser oscillation between one of said energy levels and a third energy level of said medium whereby the intensity of said second optical maser oscillation is variable in accordance with the intensity of said first optical maser oscillation; and sensing the intensity of said second optical maser oscillation as an indication of the intensity of said first optical maser oscillation.

17. The method of claim 16 wherein said second optical maser oscillation is established between said third energy level and the upper level of said first optical maser oscillation.

18. The method of claim 17 wherein said energy levels are energy levels of neon atoms, said first optical maser oscillation is at a wavelength of approximately 33912 A., and said second optical maser oscillation is at a wavelength of approximately 6328 A.

19. Apparatus for detecting electromagnetic radiation which comprises: an active medium characterized by at least two optical transitions; means for exciting said medium to produce a population inversion on each of said transitions; means for establishing optical maser oscillation on at least one of said transitions; means for selectively admitting radiation into said active medium at a wavelength effective to induce the other of said transitions, said radiation effecting changes in the intensity of said optical maser oscillation; and means for selectively sensing the intensity of said optical maser oscillation as an indication of said radiation.

20. Apparatus according to claim 19 wherein said one transition is at a visible wavelength and said other transition is at an infrared wavelength.

21. Apparatus according to claim 19 wherein said active medium is a gaseous medium and said excitation means comprises means for establishing an electrical discharge in said gaseous medium.

References Cited

UNITED STATES PATENTS

| | | | |
|---|---|---|---|
| 2,929,922 | 3/1960 | Schawlow et al. | 250—211 X |
| 3,055,257 | 9/1962 | Boyd et al. | 250—211 X |
| 3,062,959 | 11/1962 | Sclar | 250—83.3 |
| 3,070,698 | 12/1962 | Bloembergen | 250—83.3 |

OTHER REFERENCES

Vogt et al.: "Lasers: Devices and Systems—Part 1," Electronics, Oct. 27, 1961, pp. 40 to 47.

D'Haenens et al.: "Lasers and Their Applications," Journal of The SMPTE, November 1962, pp. 828 to 832.

RALPH G. NILSON, *Primary Examiner.*

ARCHIE R. BORCHELT, *Examiner.*

E. STRICKLAND, M. ABRAMSON, *Assistant Examiners.*